(12) United States Patent
Colens

(10) Patent No.: US 7,117,660 B1
(45) Date of Patent: Oct. 10, 2006

(54) SELF-PROPELLED LAWN MOWER

(76) Inventor: André Colens, rue du Baillois 5, Rixensart (BE) 1130

( * ) Notice: Subject to any disclaimer, the term of this patent is extended or adjusted under 35 U.S.C. 154(b) by 0 days.

(21) Appl. No.: 09/958,868

(22) PCT Filed: Apr. 12, 2000

(86) PCT No.: PCT/BE00/00034

§ 371 (c)(1),
(2), (4) Date: Oct. 12, 2001

(87) PCT Pub. No.: WO00/60921

PCT Pub. Date: Oct. 19, 2000

(51) Int. Cl.
*A01D 34/66* (2006.01)

(52) U.S. Cl. .................... 56/10.2 A; 56/6; 56/DIG. 7

(58) Field of Classification Search ............ 56/10.2 A, 56/10.2 F, 127, 6, DIG. 7; 180/167, 168, 180/169; 701/300, 207, 23
See application file for complete search history.

(56) References Cited

U.S. PATENT DOCUMENTS

| | | | | |
|---|---|---|---|---|
| 3,548,570 A | * | 12/1970 | Knotts et al. ............ | 56/10.2 R |
| 4,133,404 A | * | 1/1979 | Griffin .................... | 56/10.2 A |
| 4,777,785 A | * | 10/1988 | Rafaels ................... | 56/10.2 A |
| 4,817,372 A | | 4/1989 | Toda et al. | |
| 4,831,813 A | * | 5/1989 | Jonas et al. ............. | 56/10.2 A |
| 4,873,819 A | * | 10/1989 | Shivers et al. ............ | 56/12.7 |
| 4,887,415 A | * | 12/1989 | Martin .................... | 56/10.2 R |
| 5,004,234 A | * | 4/1991 | Hollis ..................... | 473/417 |
| 5,461,292 A | * | 10/1995 | Zondlo .................... | 318/587 |
| 5,906,051 A | * | 5/1999 | Nannen .................... | 30/276 |
| 5,974,347 A | * | 10/1999 | Nelson ..................... | 701/22 |
| 6,009,358 A | * | 12/1999 | Angott et al. .............. | 701/25 |
| 6,255,793 B1 | * | 7/2001 | Peless et al. ............. | 56/10.2 F |
| 6,338,013 B1 | * | 1/2002 | Ruffner .................... | 701/23 |

FOREIGN PATENT DOCUMENTS

WO 9841081 9/1998

* cited by examiner

*Primary Examiner*—Meredith Petravick
(74) *Attorney, Agent, or Firm*—Morgan Lewis & Bockius LLP

(57) ABSTRACT

A self-propelled lawn mower comprising a microprocessor and at least one cutter (10), wherein an elastic tension element (13) that is connected to the frame of the lawn mower and the at least one cutter (10) is provided. Central automatic adjustment of the height of the cutters (10) in relation to the ground is also provided. The cutters (10) consist of a rotary disk (3) with retractable blades (5) provided with a stop (4) underneath the lower surface in the form of a central extension that can come into contact with the ground.

7 Claims, 5 Drawing Sheets

SELF-PROPELLED LAWN MOWER

The present invention relates to an improved robot lawn mower more particularly adapted for the care of large surfaces.

In order to care for large lawn surfaces, of the order of several hectares, motor-driven self-propelled mowers with conductors are used. To this end, the use of robot lawn mowers would provide a number of advantages, particularly as regards manpower and environmental impact.

Nevertheless, the robot lawn mowers which have been disclosed to date, e.g. in document EP 0 550 473 B1 have certain drawbacks when used over large surfaces. The cutting width and the power of the machine must be increased. This requires the implementation of new solutions.

Hence, the use of large robot lawn mowers, e.g. having a width of 80 cm to 200 cm, implies a security problem generated by the power of the cutting means of the device. This problem may be solved by dividing the cutting system into a large number of independent elements, each having a reduced power and self-retractable blades. Such a system is proposed, for instance in the application PCT/BE98/00038.

Yet, further problems remain. For instance, grass "scalping", caused by a rotary lawn mowing system in irregular lawns, the problem of accurate and simultaneous adjustment of a number of cutting heads, and the lack of self-adaptation to grass height. The latter aspect is important for robots designed to work intermittently over large surfaces, the grass height being variable with time, robot operating time, and exact location of the lawn.

Moreover, the driving wheels of a large robot lawn mower are generally the rear wheels, typically having a significantly greater diameter than the front free wheels.

These wheels tend to provide a swing up torque, from the front of the device, when several cutting heads hit an irregularity of the ground. A lack of horizontal stability results therefrom, as well as a jump of the front of the device during its advance.

These drawbacks are more particularly, but not exclusively, associated to large robot lawn mowers. Therefore, the solutions proposed by the invention may advantageously apply to smaller devices.

The present invention particularly proposes a robot lawn mower having, individually or in combination, the following characteristics:
  cutting heads are rotating disk heads, the disks having at their periphery a variable number of small retractable blades, for instance three blades, extending into the cutting position under the effect of centrifugal force,
  several cutting heads are provided, each being associated to an independent suspension system, which allows it to "float"
  a weight compensation system is provided for each head
  a central abutment is provided, localized or integrated under the cutting member of the head, allowing each head to independently follow the profile of the lawn,
  the accurate and simultaneous height adjustment of multiple cutting heads is obtained by using a longitudinal abutment whereon the different heads, or elements associated thereto, rest laterally, allowing a centralized adjustment, while allowing an independent movement for each head
  a self-adapting cutting height adjustment system comprises a centralized head height control, combined to an algorithm stored in the robot microprocessor.

The combination of certain or all of these different original characteristics provides an effective robot device, which is still simple in construction and has an acceptable power.

Heads, e.g. five in number, may be assembled along a single line transverse to the progression of the device chassis, or in several offset lines.

The cutting heads are independently fastened to a chassis of the lawn mower, for instance to a tubular aluminum chassis, by an assembly designed to pivot freely with respect to one or more transverse pillars. This integration may be effected by means of parallel arms, which form a parallelogram and are articulated to rotating points on the transverse member. This assembly allows a constrained vertical translational movement of the head, thereby ensuring a certain floatability with respect to ground irregularities.

According to an embodiment of the invention, said cutting heads are integral with elastic ties, for instance springs, allowing to at least partly compensate for the head weight. Springs may be, for instance, tension or torsion springs. Hence, the apparent weight of the cutting head, i.e. the effort to be exerted to lift it when the central abutment contacts the ground, is considerably reduced. Assuming that a cutting head has a starting weight of 1 kg, an adequate compensation allows, for instance, to reduce the lifting effort to a few hundreds of grams.

This embodiment of the invention allows to increase the horizontal stability of the device, while reducing the lifting torque of the front part, caused by the rear driving wheels. This effect may be highly disturbing in a descending regression, which may reach 35% for the device. The jump during progression on an irregular ground is strongly reduced thereby.

The robot device is provided with a central abutment, localized or integrated under the cutting member of the head, and allowing each head to follow lawn profile independently, and with no excessive friction. According to a first embodiment, the abutment consists of a central boss, e.g. having a hemispherical shape, being a part of, integral with or integrated in the center of the lower face of the cutting disk. This abutment, which projects (e.g. 2 to 4 cm), rotates even when it occasionally contacts the ground.

The central abutment advantageously allows to bring all friction towards the rotation center of the disk, whereby it reduces the friction torque and its braking effect on the disk rotation.

According to a second embodiment, the abutment is provided on a second disk, which is coaxial to the cutting disk, and situated below the latter. The second disk advantageously rotates freely with respect to the cutting disk. A similar arrangement, already forming an anti-scalping system, which has self-cleaning features thanks to the centrifugal debris expulsion, but with no central abutment, is disclosed in the application PCT/BE96/00012.

In the two modes mentioned above, when the cutting disk or the freely rotating disk contacts the ground, the torque exerted on the axis of the disk/s is reduced or even removed, due to the fact that contact essentially or exclusively occurs on the central abutment.

It shall be noted that the above central abutments may be independently adjustable, or interchangeable, for instance by simple snapping action, in such a manner as to be adaptable to the nature of lawns having various irregularities and to the desired minimum mowing height.

According to another aspect of the invention, a centralized control system is provided for the cutting heads. In accordance with an embodiment, a transverse stop or abutment plate, for side abutment of a member of the cutting head or a member which is integral, e.g. rigidly, with the cutting head, allowing to define a minimum value for the distance between the head and the ground. This stop plate may be height-adjusted.

According to a simplified embodiment, a stem may be manually adjusted to control, by a simple and intrinsically known mechanism, the height of the stop plate and the nominal height value of the cutting heads with respect to the ground.

In accordance with a variant, this stem is directly controlled by a motor and an electronic control box, which allows an automatic adjustment of the cutting head/s as a function of an algorithm stored in the inboard computer, which algorithm accounts, for instance, for the speed of the device and/or the resistance to the rotation of the cutting disk and/or the inclination of the device and/or the moisture degree of the surface to be mowed.

To this effect, according to another aspect of the invention, an automatic height control process is proposed for the cutting head/s.

In fact, the mowing principle used by the robot lawn mowers of the present invention, advantageously relates to frequent, sometimes even permanent, mowing operations. The robot cuts little by little at each run, the collection of grass debris being useless, the latter decomposing and fertilizing the lawn as they are generated.

Nevertheless, it may happen that, at the beginning of the season, or after an extended idleness of the machine, or even for a new definition of the surface to be mowed, the grass has grown or is too high and that the machine adjusted to its nominal height (e.g. by means of a lever) cuts an excessive height of grass, which generates an unattractive aspect, and a great amount of grass debris, deteriorating the lawn. The control process proposed by the invention allows to obviate the above drawbacks.

According to this automatic control process, when the lawn mower is started, the microprocessor controls the cutting head/s to be lifted to their maximum height. Heads will be lowered only once the mower has started.

The microprocessor constantly analyzes the average rotational speed of the cutting disk/s. As long as the latter is higher than a predefined value Vr, a value which corresponds to the speed of heads when they cut a grass height to be never exceeded, the microprocessor keeps on controlling the heads to be lowered, towards the nominal value. If the average rotational speed decreases below Vr, the lowering movement is stopped to be only resumed when the cut resistance decreases.

Thanks to this arrangement, the lawn mower never cuts more than a predetermined height at a time, and the grass height progressively tends towards its nominal value, while maintaining an attractive aspect.

Therefore, the disclosed apparatus allows to improve the self-adapting feature of the machine. Besides a regular mowing operation, the microprocessor may also use the apparatus to improve features of obstacle bypassing, tree root release, or passage above dead leaf carpets.

The latter case is particularly advantageous, the presence of the leaf carpet being the source of a number of operating difficulties for a standalone robot lawn mower having a limited power. In Autumn, large dead leaf carpets appear beneath and besides trees. When the robot passes above this carpet, a substantial amount of leaves may be trapped in the cutting head/s, which may occasionally cause the machine to be locked or stopped. According to the invention, when the microprocessor detects a resistance above the normal at the cutting disks and over a certain distance, the microprocessor controls the stepping motor to perform a head lifting operation to the maximum, before lowering them progressively according to the above method.

The invention will be better understood with reference to the drawings illustrated by way of example only.

Figure 1:
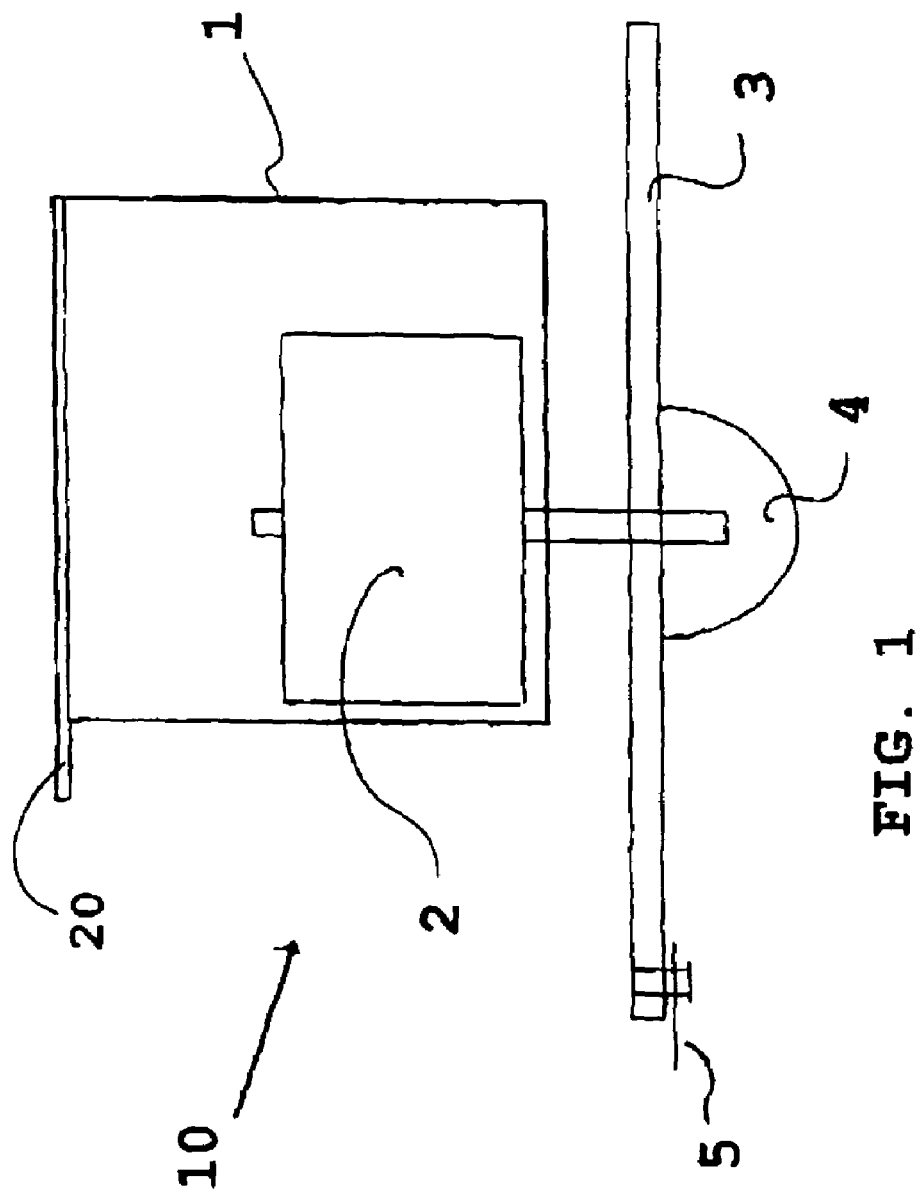
FIG. 1 is a schematic view of a cutting head.

FIG. 1 schematically shows a cutting head 10 which is composed of a case 1 containing a motor 2 which drives a cutting disk 3 having retractable blades 5 and an approximately hemispherical central abutment 4 which can contact the ground.

Figure 2:
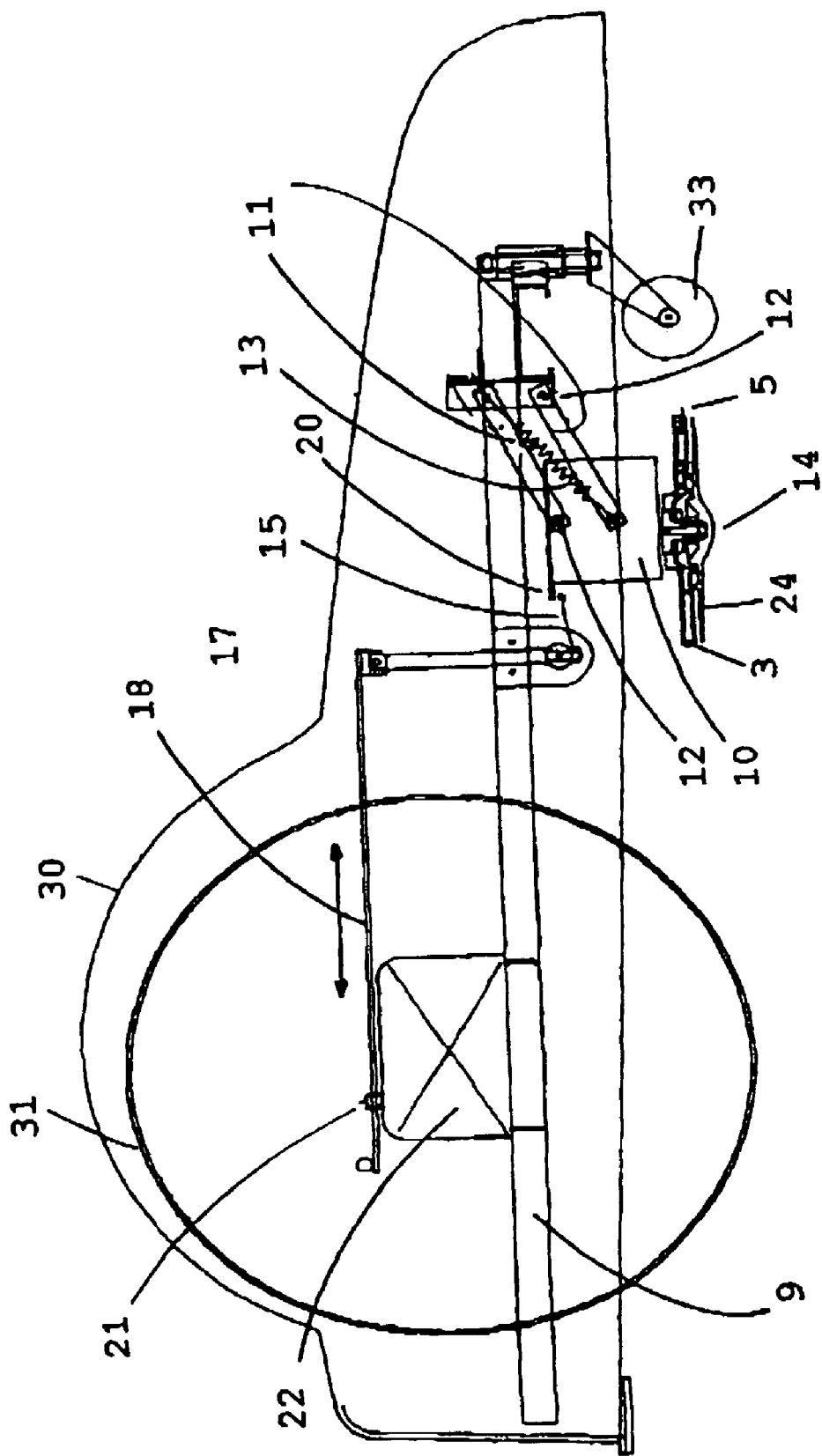
FIG. 2 is a schematic sectional elevational view of a robot lawn mower according to the invention.
Figure 3:
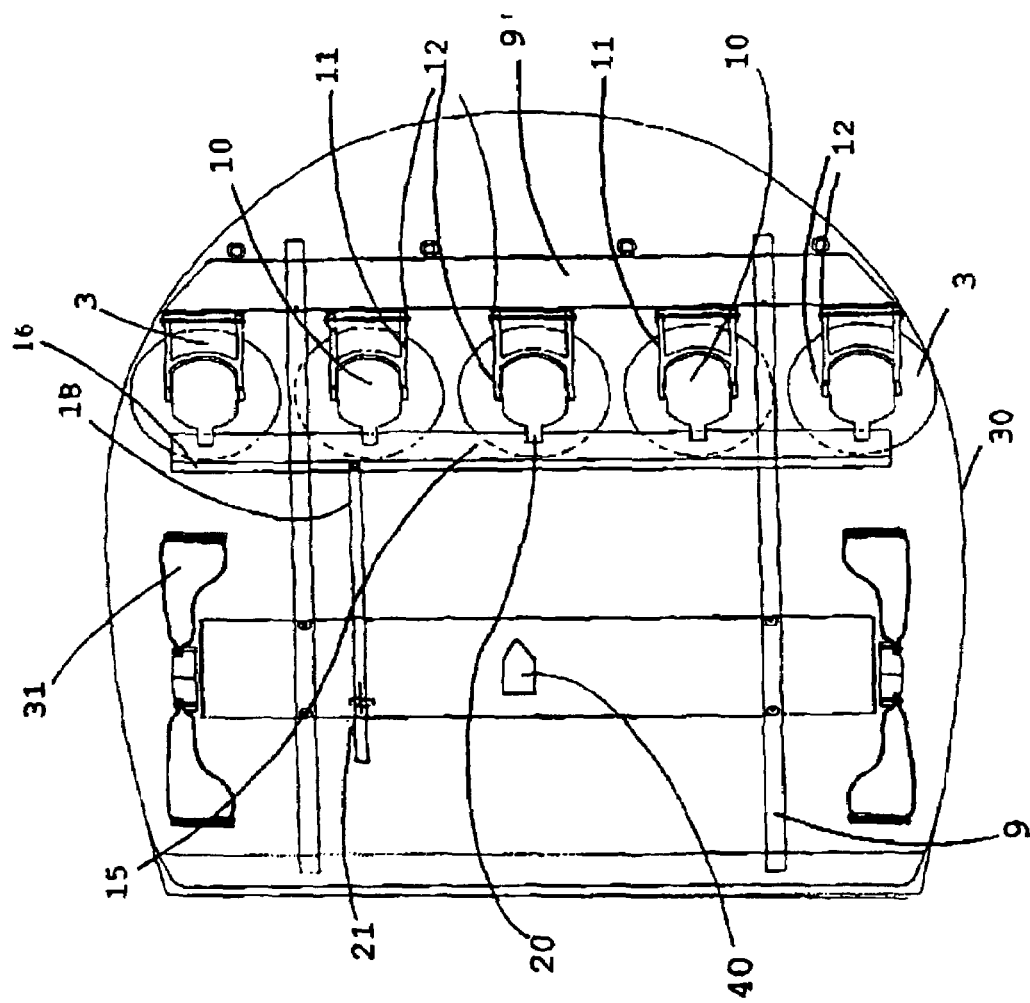
FIG. 3 is a schematic sectional plane view of the lawn mower of FIG. 2.
Figure 4:
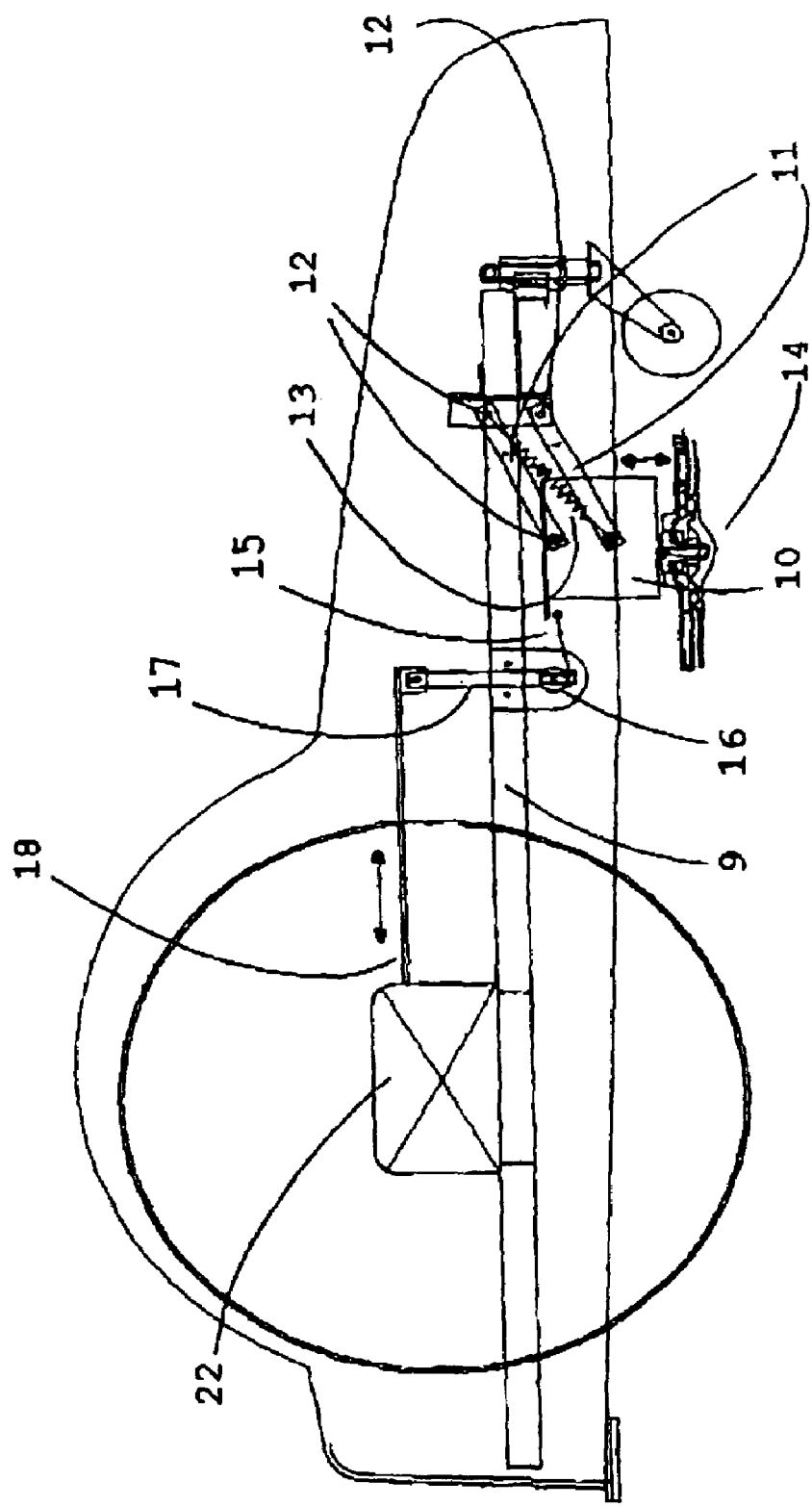
FIG. 4 shows a preferred variant, incorporating an automatic cutting height adjustment system.

With reference to FIGS. 2 to 4, a transverse schematic cut of a robot lawn mower according to the invention is shown. For example the latter may be 1.2 m long, 1.16 m wide and 0.5 m high. Its weight, battery included, will range from 40 to 50 kg. There may be distinguished a fairing 30, idle front wheels 33 and two rear driving wheels 31 with integrated gearmotors, steering control being obtained by automatic control of the speed difference between the driving wheels. Since the device is heavier and may proceed faster than small robot lawn mowers, a sonar 40 is provided at the top of the fairing, allowing to remotely detect physical obstacles, and to reduce speed as it approaches said obstacles.

In FIG. 2, the cutting disk 3 is disposed above a freely rotating coaxial plate or disk 24, having a central abutment 14.

The cutting heads 10 are fastened to the tubular chassis of the lawn mower (longitudinal and transverse members 9, 9') by means of parallel arms 11 which form a parallelogram and are articulated at the pivoting points 12. This assembly allows the vertical translational movement of the head relative to the chassis.

Elastic ties are also illustrated, in the form of tension springs 13, allowing to at least partly compensate for the head weight, hence to stabilize the device on an irregular ground.

A lateral stop plate or abutment 15, whereon an extension 20 of the cutting head abuts allows to define a minimum value of the distance between the head and the ground. This stop plate may be adjusted in height, from 25 to 65 mm, by being pivoted about the axis 16 under the effect of a lever 17, itself driven through a stem 18. The edge of the stop plate designed to receive the abutting extensions 20 of the cutting heads 10 is advantageously covered with a rubber sheath (not shown) to absorb shocks due to ground irregularities. In a simplified embodiment, the stem 18 acts on the nominal height of the cutting head/s 1 by being adjusted manually through an adjustment screw 21 (FIG. 2). The stem comprises several holes all over its length which may receive a locking screw allowing several translational locking possibilities, i.e. by the lever, several nominal heights of the cutting heads.

In accordance with a particularly advantageous variant (FIG. 4), an automatic adjustment is rather provided, controlled by an inboard computer. Then, the stem 18 is included in the electronic control case 22. This stem 18 is driven by a linear stepping motor allowing a front to back displacement of the stem 16, hence, by a simple lever system 17, a nominal height control on the heads 10 resting on the abutment 15 through the lateral extensions 20.

Figure 5:
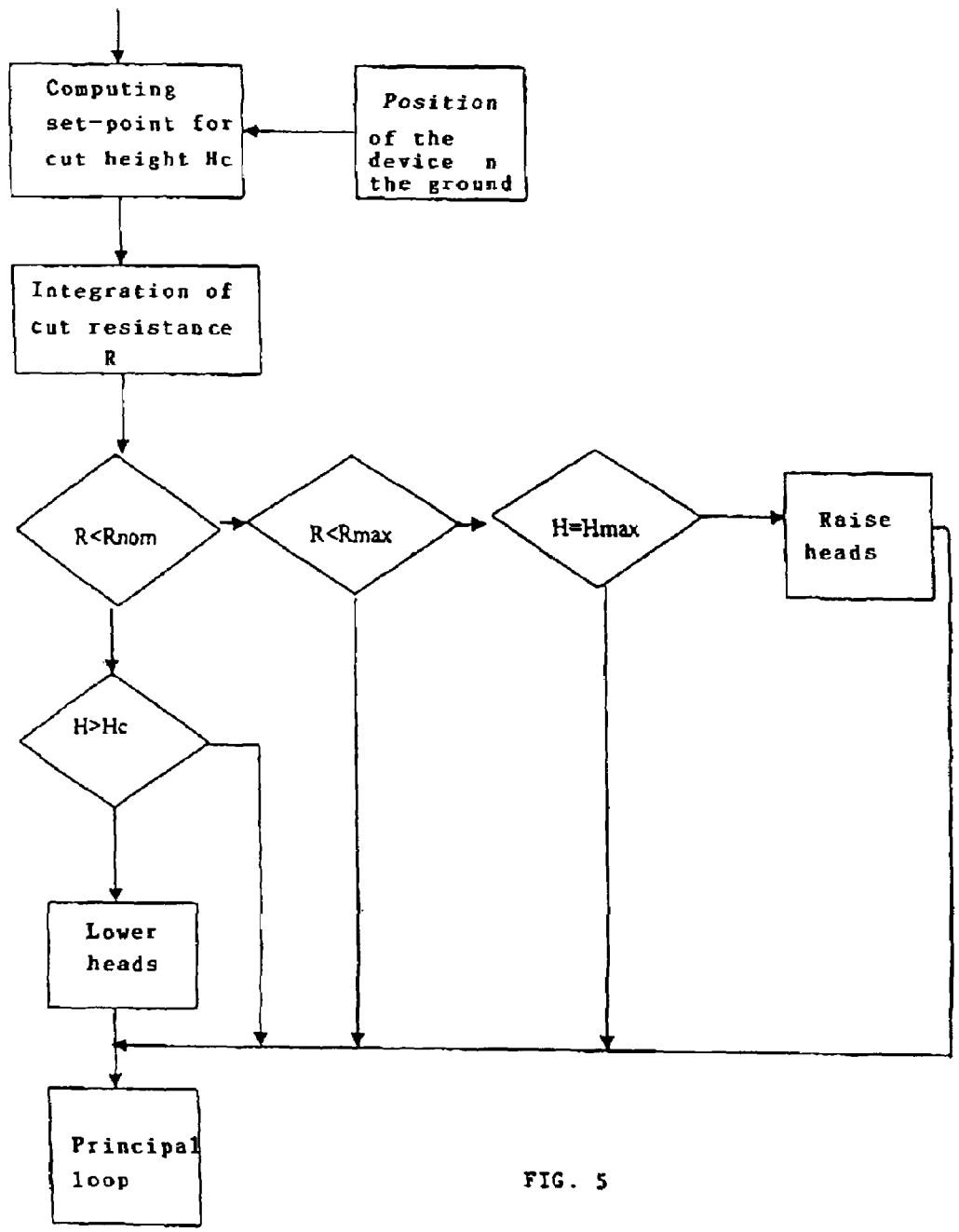
FIG. 5 is a block diagram showing a simplified cutting head height automatic control algorithm.

FIG. 5 is a block diagram showing a simplified automatic cutting head height control algorithm. A cutting height instruction Hc is entered or automatically computed as a function of the position of the machine on the ground. The machine constantly integrates cut resistance R. If this resistance is below a nominal resistance Rnom and the height is above the instruction, the cutting head is lowered. If the resistance is not below the nominal resistance, if it is above the maximum resistance Rmax, and if the height is not already equal to the maximum height, then the system will raise the cutting heads.

The robot device of this invention is particularly suitable for the care of large grass surfaces like those of golf courses.

The care of golf courses involves an important manpower effort, and automation thereof is an apparent advantage.

Hence, mowing "fairways" can represent about 80% of maintenance charges and implies very particular requirements. One of the latter consists in obtaining a degressive height from the periphery to the center of the fairway. Lawn mowing may be performed, for instance, at an height of 8 cm over 4 meters width, at an height of 6 cm over the next 4 m width toward the center, at an height of 4 cm over the next 4 m and at an height of 2 cm at the center. The automatic height control, possibly combined with circular band lawn mowing, such as described in this application allows a wholly automatic control of this mowing type.

Thanks to constant measurement of the course by a peripheral delimiting wire of the working surface such as the one described in patents EP 0550 472 B1 and 0 744 093 B1, the machine constantly determines its distance from the wire and allows to control the cutting height as a function of said distance. Lawn mowing will be effected in parallel bands starting from the periphery and with a degressive cutting height, in a near-continuous manner or through sections, as described above.

The invention addresses any novel element of the present description, that, as will be understood by the skilled person, may be considered in standalone or combined configurations.

The invention claimed is:

1. A self-propelled robotic lawn mower comprising a chassis, a microprocessor, a plurality of cutting heads each of which comprises a rotating disk with retractable blades, each of said cutting heads being pivotally mounted on a support member by means including a tension elastic member which is integral on the one hand to the device chassis and on the other hand to the cutting head, the device having a self-adapting cutting adjustment system comprising a centralized height control member controlling the height of each of said cutting heads, said control member being operatively associated with an algorithm stored in the microprocessor such that when the lawn mower is started, the microprocessor in conjunction with the centralized height control member controls the cutting heads to lift same through a maximum height, the heads being later progressively lowered as the mower moves while the microprocessor constantly analyses an average rotational speed of the cutting disks so that as long as the average rotational speed is above a predetermined value Vr, which corresponds to the speed of the cutting disks when they cut a grass height not to be exceeded, the microprocessor keeps on controlling the heads to lower the same towards a nominal instruction value, and wherein if the average rotational speed decreases below Vr, lowering of the cutting disks is stopped to be only resumed when the cut resistance decreases, the microprocessor being adapted to control grass height at a predetermined level in a predetermined location throughout the mowing operation.

2. The device as claimed in claim 1, wherein at least three cutting heads are provided.

3. The device as claimed in claim 1, wherein each said cutting head comprises a rotating disk having a hemispherical abutment under the lower face, in the form of a central extension adapted to contact the ground.

4. The device as claimed in claim 3, characterized in that the abutment is integral or integrated with the center of the disk, and is mounted coaxially under the cutting disk, in such a manner as to rotate freely.

5. The device as claimed in claim 1, characterized in that the control is automatic and depends from the average rotational speed of the cutting members of the cutting head and/or of each cutting member.

6. The device as claimed in claim 1 wherein the microprocessor is adapted to change the height of said cutting head as a function of the position of the device over a predetermined work surface.

7. The device as claimed in claim 6, wherein the microprocessor is adapted to determine the position of the mower by the intensity of a magnetic field emitted by a peripheral wire which delimits said work surface.

* * * * *